United States Patent
Aung et al.

(10) Patent No.: US 11,935,029 B2
(45) Date of Patent: Mar. 19, 2024

(54) CLASSIFICATION BY NATURAL LANGUAGE GRAMMAR SLOTS ACROSS DOMAINS

(71) Applicant: SoundHound, Inc., Santa Clara, CA (US)

(72) Inventors: Joe Aung, San Jose, CA (US); Jonah Probell, Alviso, CA (US)

(73) Assignee: SoundHound, Inc., Santa Clara, CA (US)

(*) Notice: Subject to any disclaimer, the term of this patent is extended or adjusted under 35 U.S.C. 154(b) by 1050 days.

(21) Appl. No.: 16/121,967

(22) Filed: Sep. 5, 2018

(65) Prior Publication Data

US 2019/0073660 A1    Mar. 7, 2019

(30) Foreign Application Priority Data

Sep. 5, 2017  (CN) .......................... 201710791381.3

(51) Int. Cl.
*G06Q 20/24*        (2012.01)
*G06F 9/54*         (2006.01)
(Continued)

(52) U.S. Cl.
CPC .............. *G06Q 20/24* (2013.01); *G06F 9/547* (2013.01); *G06F 16/285* (2019.01);
(Continued)

(58) Field of Classification Search
CPC ..... G06Q 20/24; G06F 16/285; G06F 40/253; G06F 40/211; G06F 40/205; G06F 40/30; G06F 9/547
See application file for complete search history.

(56) References Cited

U.S. PATENT DOCUMENTS 9,990,613 B1 *  6/2018  Bhatt ..................... G06Q 20/26
10,453,117 B1 * 10/2019  Reavely ................. G06N 5/027
(Continued)

FOREIGN PATENT DOCUMENTS

CN         1570921 A       1/2005
CN       101377770 A       3/2009
(Continued)

OTHER PUBLICATIONS

"Pricing," Google Cloud Natural Language API, dated Jul. 15, 2017 https://web.archive.org/web/20170715200648/https://cloud.google.com/natural-language/pricing (Year: 2017).*
(Continued)

*Primary Examiner* — Gregory S Cunningham, II
*Assistant Examiner* — Raven E Yono
(74) *Attorney, Agent, or Firm* — Michelle C. Dunn

(57) ABSTRACT

A virtual assistant processes natural language expressions according to grammar rules created by domain providers. The virtual assistant uniquely identifies each of a multiplicity of users and stores values of grammar slots filled by natural language expressions from each user. The virtual assistant stores histories of slot values and computes statistics from the history. The virtual assistant provider, or a classification client, provides values of attributes of users as labels for a machine learning classification algorithm. The algorithm processes the grammar slot values and labels to compute probability distributions for unknown attribute values of users. A network effect of users and domain grammars make the virtual assistant useful and provides increasing amounts of data that improve classification accuracy and usefulness.

12 Claims, 13 Drawing Sheets

(51) Int. Cl.
  *G06F 16/28*   (2019.01)
  *G06F 40/205*  (2020.01)
  *G06F 40/211*  (2020.01)
  *G06F 40/253*  (2020.01)
  *G06F 40/30*   (2020.01)

(52) U.S. Cl.
  CPC .......... *G06F 40/205* (2020.01); *G06F 40/211* (2020.01); *G06F 40/253* (2020.01); *G06F 40/30* (2020.01)

(56) References Cited

U.S. PATENT DOCUMENTS

| | | | |
|---|---|---|---|
| 2010/0286985 | A1 | 11/2010 | Kennewick et al. |
| 2013/0132366 | A1* | 5/2013 | Pieper .................. G06F 16/954 707/710 |
| 2013/0282381 | A1* | 10/2013 | Mauro ................... G06F 3/167 704/E21.001 |
| 2016/0132773 | A1 | 5/2016 | Chandrasekaran et al. |
| 2017/0011023 | A1 | 1/2017 | Ghannam et al. |
| 2017/0070398 | A1* | 3/2017 | Singhal .................... G06N 7/01 |
| 2018/0101780 | A1* | 4/2018 | Allen ...................... G06N 5/022 |

FOREIGN PATENT DOCUMENTS

| | | | | |
|---|---|---|---|---|
| CN | 101939740 | A | | 1/2011 |
| CN | 103226949 | A | | 7/2013 |
| CN | 104778945 | A | | 7/2015 |
| CN | 105247511 | A | | 1/2016 |
| CN | 105677635 | A | | 6/2016 |
| CN | 106991107 | A | | 7/2017 |
| CN | 107111611 | A | | 8/2017 |
| EP | 1475778 | A1 | * | 11/2004 ............. G10L 15/18 |
| JP | 2005-011089 | A | | 1/2005 |
| JP | 2006018725 | A | | 1/2006 |
| JP | 2008-112279 | A | | 5/2008 |
| JP | 2009014968 | A | | 1/2009 |
| JP | 2014006767 | A | | 1/2014 |
| JP | 2014209391 | A | | 11/2014 |
| JP | 2016004270 | A | | 1/2016 |
| JP | 2017-062741 | A | | 3/2017 |
| JP | 2017062741 | A | | 3/2017 |

OTHER PUBLICATIONS

"Get started with Google Domains" by Google Support, dated Feb. 17, 2015, https://web.archive.org/web/20150217134043/https://support.google.com/domains/answer/3453651?hl=en (Year: 2015).*
"Deep parsing in Watson" by M. C. McCord, dated 2012, https://ieeexplore.ieee.org/stamp/stamp.jsp?tp=&arnumber=6177729 (Year: 2012).*
"Slot Grammars" by Michael McCord, dated 1980, https://aclanthology.org/J80-1003.pdf (Year: 1980).*
Jianbo Yuan, et al., Solving Cold-Start Problem in Large-scale Recommendation Engines: A Deep Learning Approach, IEEE International Conference on Big Data, Nov. 16, 2016 arXiv:1611.05480v1 [cs.IR] Nov. 16, 2016.
Sander Dielman, Recommending music on Spotify with deep learning, blog post, http://benanne.github.io/2014/08/05/spotify-cnns.html, Aug. 5, 2014.
Xiaoxue Zhao, Cold-Start Collaborative Filtering, PhD disertation, University College London, Jan. 18, 2016.
Aleš Tavčar, et al., Recommender System for Virtual Assistant Supported Museum Tours, Informatica 40 pp. 279-284, 2016.
Xiaohu Liu, et al., Personalized Natural Language Understanding, Interspeech, Jul. 22, 2016.
Yun-Nung Chen, et al., Unsupervised induction and filling of semantic slots for spoken dialogue systems using frame-semantic parsing, IEEE Workshop on Automatic Speech Recognition and Understanding (ASRU), pp. 120-125, Nov. 2013.
David Bamman, People-Centric Natural Language Processing, PHD Thesis, Carnegie Mellon University, School of Computer Science, Language Technologies Institute, 2015.
Pasquale Lops, et al., Improving Social Filtering Techniques Through WordNet-Based User Profiles, International Conference on User Modeling 2007, pp. 268-277, 2007.
Maarten Sap, et al., Developing Age and Gender Predictive Lexica over Social Media, Proceedings of the 2014 Conference on Empirical Methods in Natural Language Processing (EMNLP), pp. 1146-1151, Oct. 25-29, 2014, Doha, Qatar.
Julia Hirschberg, et al., Advances in natural language processing, Science Magazine, Jul. 17, 2015, vol. 349, Issue 6245, p. 261-266.
Boris Galitsky, "Improving relevance in a content pipeline via syntactic generalization"; Engineering Applicationsof Artificial Intelligence, vol. 58 (2017) 1-26.
The Second Office Action issued by the CNIPA dated Jun. 30, 2023 for the counterpart Chinese application No. 201710791381.3.

* cited by examiner

```
grammar: "Weather Domain"

// defaults
$l = current_location();
$t = current_time();

"What ('s|is|will be|is going to be) the
weather [going to be] [(in|at) <location $l>]
[[on] <time $t>]"
```

FIG. 6A

|  | slot values | | parameter values | |
| --- | --- | --- | --- | --- |
|  | $l | $t | gender | beverage |
| user 1 | Beijing | now | F |  |
| user 2 | Holland | now | M | coffee |
| user 3 | Beijing | tomorrow | F | tea |
| user 4 | Beijing | now |  | tea |
| user 5 | Holland | tomorrow | M | tea |
| user 6 | Holland | now | F | coffee |
| user 7 | Beijing | tomorrow | M |  |
| user 8 | Holland | now |  | coffee |
| user 9 | Beijing | now |  | coffee |
| user 10 | Beijing | tomorrow |  | tea |
| ... | | | | |
| user N | Beijing | now |  | ? |

FIG. 7 grammar: "Latin Name Domain"

"What is the Latin name for <species $s>"

FIG. 8A grammar: "Exercise Energy Domain"

"How much energy is used by a <weight $w> pound person doing <activity $a> for <duration $d> minutes"

FIG. 8C

|        | slot values | | parameter values |
|--------|---------|---------|----------|
|        | $a | kingdom | beverage |
| user 1 | running | plant | tea |
| user 2 | biking | animal | coffee |
| user 3 | running | animal | coffee |
| user 4 | walking |  | tea |
| user 5 | biking | plant | coffee |
| user 6 |  | animal | coffee |
| user 7 | running | plant | tea |
| user 8 | running | plant | coffee |
| user 9 | walking | animal | tea |
| user 10 | biking | plant | tea |
| ... | | | |
| user N | running |  | ? |

FIG. 9

CLASSIFICATION BY NATURAL LANGUAGE GRAMMAR SLOTS ACROSS DOMAINS

CROSS-REFERENCE TO RELATED APPLICATION

This application claims priority to Chinese Patent Application No. 201710791381.3, filed on Sep. 5, 2017.

FIELD OF THE INVENTION

The present invention is in the field of machine learning and, in particular, classifying users based upon what they say to a system for natural language understanding.

BACKGROUND

Domains and Grammars

Increasing numbers of people are users of virtual assistants, such as SoundHound Hound, Okay Google, Amazon Alexa, Apple Siri, Line Clova, Microsoft Cortana, KT Giga Genie, and SK Telecom NUGU. Such systems have various domains of knowledge such as weather, news, trivia, restaurants, math, Wikipedia. Such systems also have various domains of capabilities such as thermostat, lighting control, music playing, SMS texting, and making calendar appointments. Some virtual assistants are closed systems in that a single company controls what domains are available. This can help to ensure a friendly user experience. Some virtual assistants are open systems in that third parties can create domains.

Some systems have thousands of third party domain providers. Many are small companies or even individual programmers. Many domains access web application programming interfaces (APIs) in order to access specific information or dynamic information or to cause requested actions. For example, some weather domains access national weather service APIs to get weather report information.

Many APIs require requests to provide a requester ID, and the API provider stores a number of credits assigned to each requester ID. Each API request consumes an amount of credits. Such APIs track credits for each requester and restricts each requester to only a certain number of credits. Some such APIs provide a number of credits each day. Some such embodiments allow requesters to buy credits.

Many virtual assistant systems use a client-server architecture in which a client device provides a user interface and a server provides high performance processing and access to large amounts of data. Various systems accept speech or other forms of natural language expressions from network-connected devices, such as phones, cars, robots, shopping kiosks, and appliances.

To support easy user access to their knowledge and capabilities, domains also include grammars. A grammar is a set of words and phrasing that a natural language processing system can use to parse user expressions as being ones directed to the domain. Grammars have grammar rules that operate on grammar slots that the system fills with information from expressions.

For example, a grammar to give weather reports has a slot for <location> and <time>. If a user asks, "what's the weather in Timbuktu tomorrow", the system fills the <location> slot with the value "Timbuctoo" and the <time> slot with the value "tomorrow". If a user says, "where is the nearest French restaurant with at least 4 stars" then the system uses a grammar for the restaurant domain that has a <food style> slot with value "French" and a <star rating> slot with a value "at least 4". If a user says, "text mom I love you", the system uses a grammar slot for a SMS texting domain and fills the slots <recipient> with "mom" and <message> with "I love you". If a user says, "how many claws does a cat have", the system uses an animal domain grammar and fills the slot <species> with value "cat" and slot <attribute> with "claws" and slot <question> with "how many". Some systems store a history of user expressions.

In general, the more domains that a virtual assistant has, the more users like it, and the more that users like a virtual assistant, the more incentive domain providers have to create and improve domains.

Classification

Classification is a useful type of supervised machine learning algorithm. It computes a probability of which of a set of classes an unknown value belongs, based on a training set of data containing values whose class membership is known and labeled. Classification results are probability distributions, though some algorithms output only the most probable value. For example, consider a large dataset of individual cars, each labeled by its brand, such as Volkswagen or Ferrari, and labeled by its color, such as red or silver. For an unseen Ferrari, a classification algorithm can compute the probability that it is red and the probability that it is silver. For an unseen red car, a classification algorithm can compute the probability that it is a Ferrari and the probability that it is a Volkswagen.

Classification of people is useful for many purposes. Advertising is one. For example, male people and female people respond to some ads with very different levels of interest. Given a large dataset of people's names and genders, a system that knows a new user's name can compute a probability that the user is male or female. As a result, the system can choose to show an ad with the greatest level of interest.

SUMMARY OF THE INVENTION

The present disclosure is directed to systems and methods and computer readable media that apply machine learning algorithms to classify virtual assistant users based on values of grammar slots. Further disclosed are systems, methods, and computer readable media for clients of classification to provide training data in order to receive high value classifications. Further disclosed are systems, methods, and computer readable media that use classification to improve the accuracy of interpretation of natural language expressions.

BRIEF DESCRIPTION OF THE DRAWINGS

FIG. 6A illustrates a grammar rule in English according to some embodiments.

FIG. 7 illustrates a database of grammar slot values and user attribute labels according to some embodiments.

FIG. 8A illustrates an English grammar rule according to some embodiments.

FIG. 8C illustrates another English grammar rule according to some embodiments.

FIG. 9 illustrates a database of grammar slot values and user attribute labels according to some embodiments.

DETAILED DESCRIPTION

Various companies are virtual assistant providers, and many things are virtual assistants. For example, some virtual assistants are apps on a mobile phone. Some virtual assistants are stationary speaker devices in homes. Some virtual assistants are public vending machines. Some virtual assistants are automobiles.

Some virtual assistants have text-based interfaces that use typing or gestures and have display screens. Some virtual assistants have speech interfaces that use speech recognition on speech audio captured from users and provide speech through text-to-speech modules. Some virtual assistants use other interfaces such as neural activity detection and stimulation. Some virtual assistants have multiple modes of user interfaces.

Figure 1:
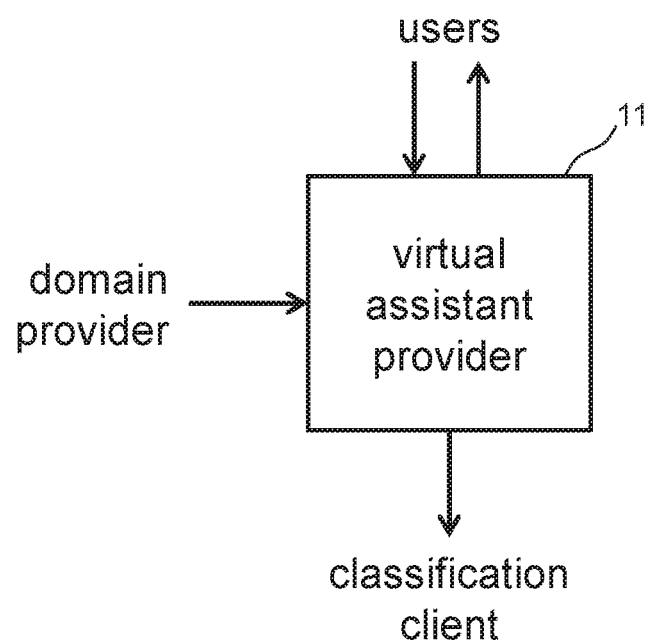
FIG. 1 illustrates information flow according to some embodiments.

FIG. 1 shows a high-level view of the information flow to and from a virtual assistant provider 11 that can perform classification according to some embodiments. Virtual assistant users input expressions to the virtual assistant provider 11 and get responses (either verbally, visually, as an action, or any combination). Domain providers produce grammars that the virtual assistant provider 11 uses to interpret user expressions. Not shown in FIG. 1 are accesses to data sources or action services that the virtual assistant can invoke in response to user expressions.

Furthermore, virtual assistant provider 11 can perform classification. Responsive to requests, from a classification client, for information about a specific user, the virtual assistant provider provides classification information to the classification client. Some embodiments perform user classification in real-time in response to requests. Some embodiments compute and store user classification information and simply look up results in response to classification requests.

An advantage of user classification by virtual assistant providers is that it gives very valuable classification information about specific users to the classification client without giving the users' personal information to the classification client.

Grammar-Based Virtual Assistants

Some embodiments use modular domain-specific grammars. Most virtual assistant providers create at least a few domain grammars by themselves. Providers of open systems allow (and depend on) third-party domain providers to create useful grammars. Generally, such grammars instruct the virtual assistant how to respond in a useful way to expressions that the grammar can interpret. Generally, such ways of responding are to access a web API to request desirable information or perform a desired action.

Figure 2:
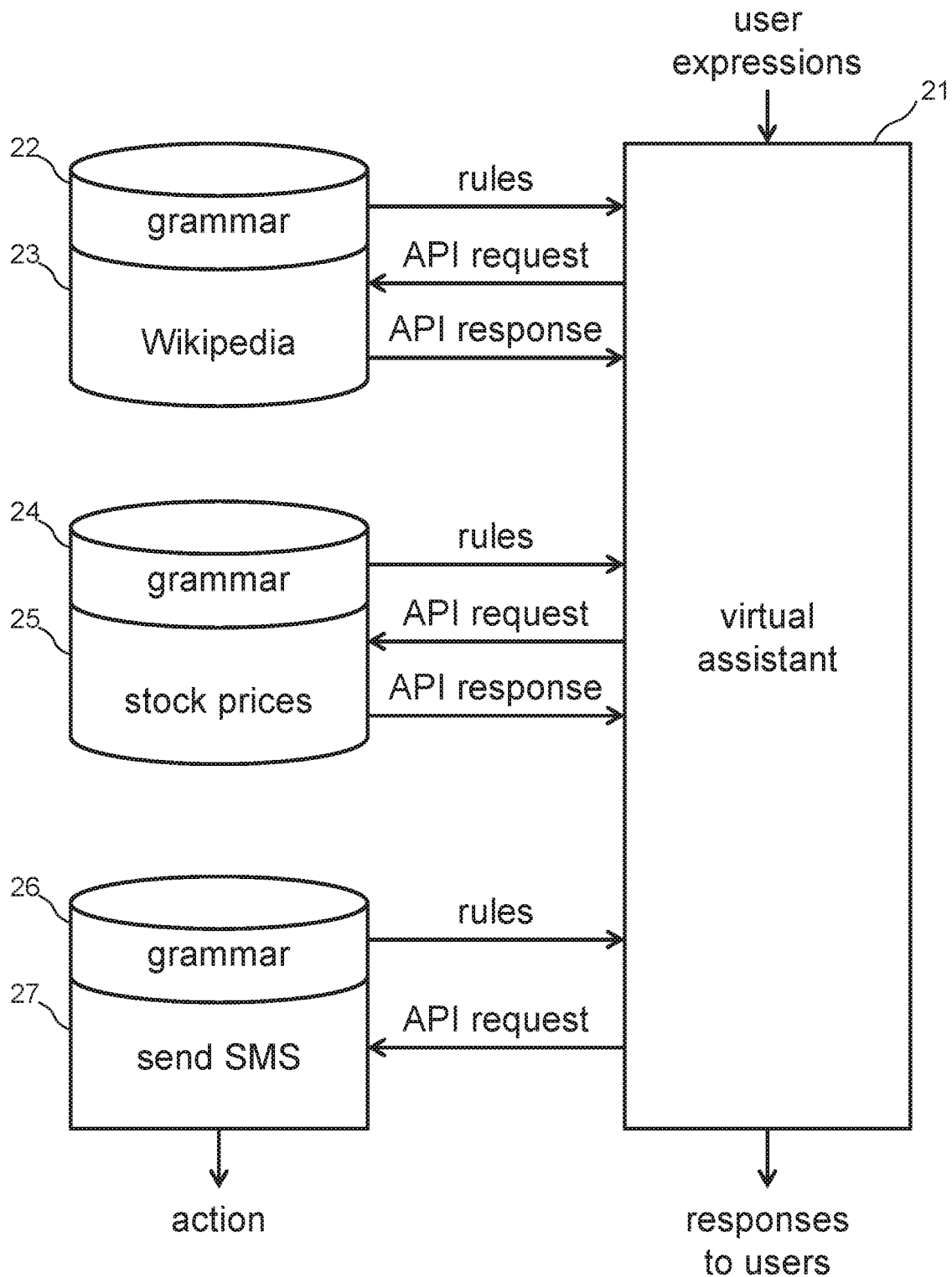
FIG. 2 illustrates a virtual assistant with modular domain grammars, each providing access to different APIs according to some embodiments.

FIG. 2 shows an embodiment of a modular virtual assistant 21. It receives user expressions and interprets them using natural language understanding according to grammars. Virtual assistant 21 receives grammar 22, which provides grammar rules useful for interpreting expressions that request information available from Wikipedia. When the virtual assistant 21 interprets that an expression most closely relates to the grammar 22, it performs an API request to Wikipedia 23 and receives an API response with the user's requested information. The virtual assistant 21 proceeds to create and output a response for the user.

In the embodiment of FIG. 2, the virtual assistant 21 also uses grammar rules from a grammar 24 related to the stock market. When an expression is most closely related to the grammar 24, the virtual assistant 21 performs an API request to a source of stock price data 25. The data source 25 provides and API response, which the virtual assistant 21 provides in a user response.

In the embodiment of FIG. 2, the virtual assistant 21 also uses grammar rules from a grammar 26 related to sending SMS text messages. When an expression is most closely related to sending an SMS message, the virtual assistant 21 performs an API request to an SMS sending service 27, which proceeds to perform the requested SMS sending action.

Some virtual assistants support thousands of domains with grammars and, in many cases, associated sources of information or action capabilities.

Capturing Slot Values

Figure 3:
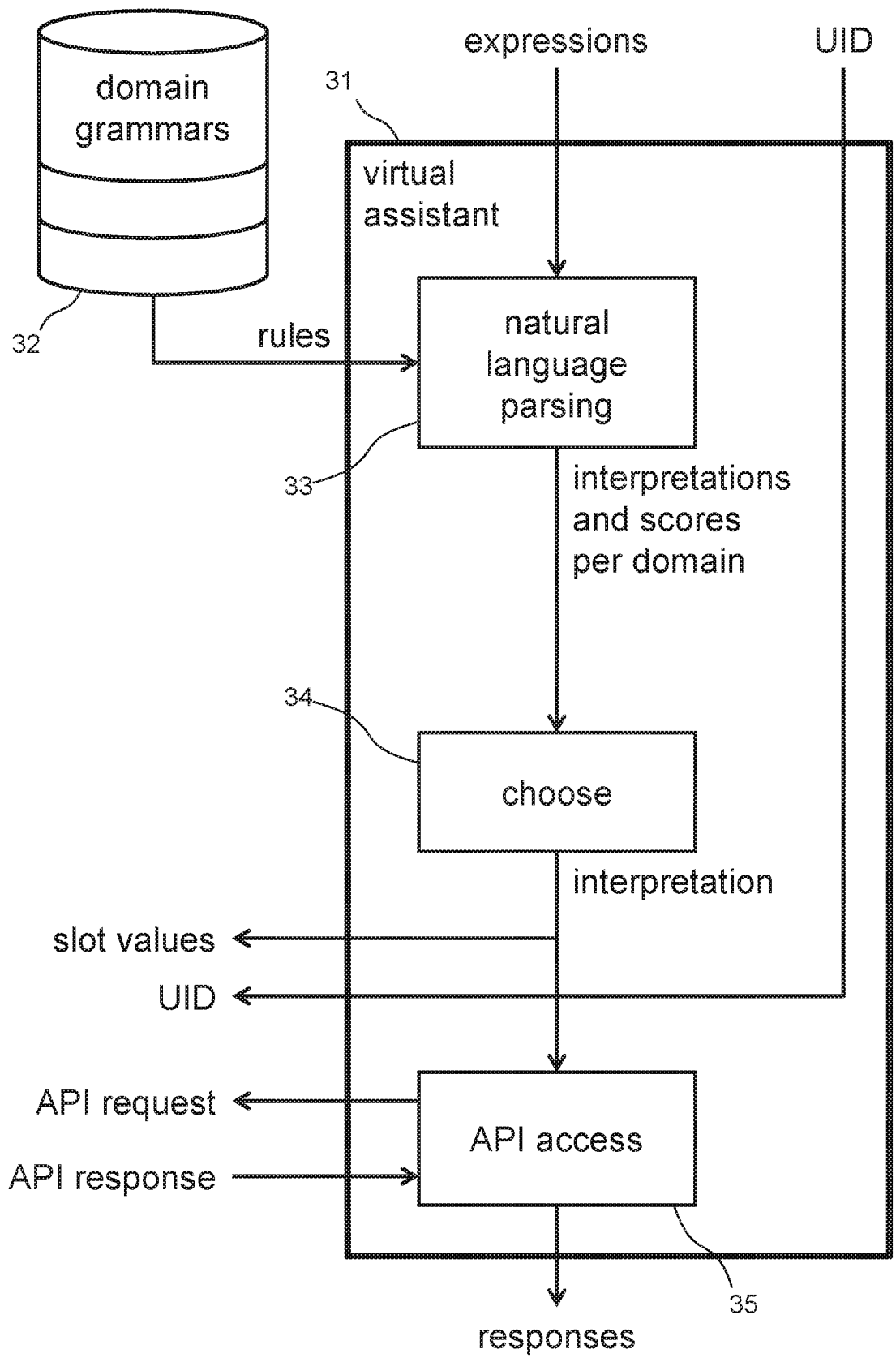
FIG. 3 illustrates a virtual assistant the produces slot values associated with user IDs according to some embodiments.

FIG. 3 shows the components of a virtual assistant 31. It receives user expressions and takes in grammar rules from a set of domain grammars 32. A natural language parsing module 33 parses the expression according to the grammar rules to produce a set of possible interpretations and a likelihood score for each one. The likelihood score indicates how likely it is that the user intended the expression to be interpreted under a rule. For example, "order an apple tart" would have a high score in the bakery domain and a low score in the technology domain, but "order an Apple part" would have a high score in the technology domain but a low score in the bakery domain. For example, Mandarin Chinese words and/or phrases related to flowers would have a high score in the flower domain but a low score in the technology domain, but Mandarin Chinese words and/or phrases related to technology would have a high score in the technology domain but a low score in the flower domain.

A choosing module 34 takes in the interpretations and scores, chooses one interpretation, according to the scores, and outputs the chosen interpretation. An API access module 35 performs a web API hit, which comprises making an API request and receiving an API response over a network, such as the Internet.

Interpretations include values for grammar slots specified by the grammar rule that created the interpretation. Generally, the values of grammar slots are arguments for API hits.

In the embodiment of FIG. 3, virtual assistant 31 receives a user ID (UID) with each user expression. In response to choosing an interpretation, virtual assistant 31 outputs the UID and the slot values of the chosen interpretation.

Identifying Users

Each user has a UID such as a unique number, a user name, or an email address. Some systems use device IDs, which are effective to identify users of personal devices such as a device serial number or International Mobile Equipment Identity (IMEI) number. Facebook Connect, Google+ Sign-in, QQ, or Renren social sign login APIs also provide seamless ways to identify users across service or device systems. Voice ID, retina scan, phone RFID, government identification number, and credit card number are other ways that can be used additionally or alternatively to identify users.

Labeling Users

Figure 4:
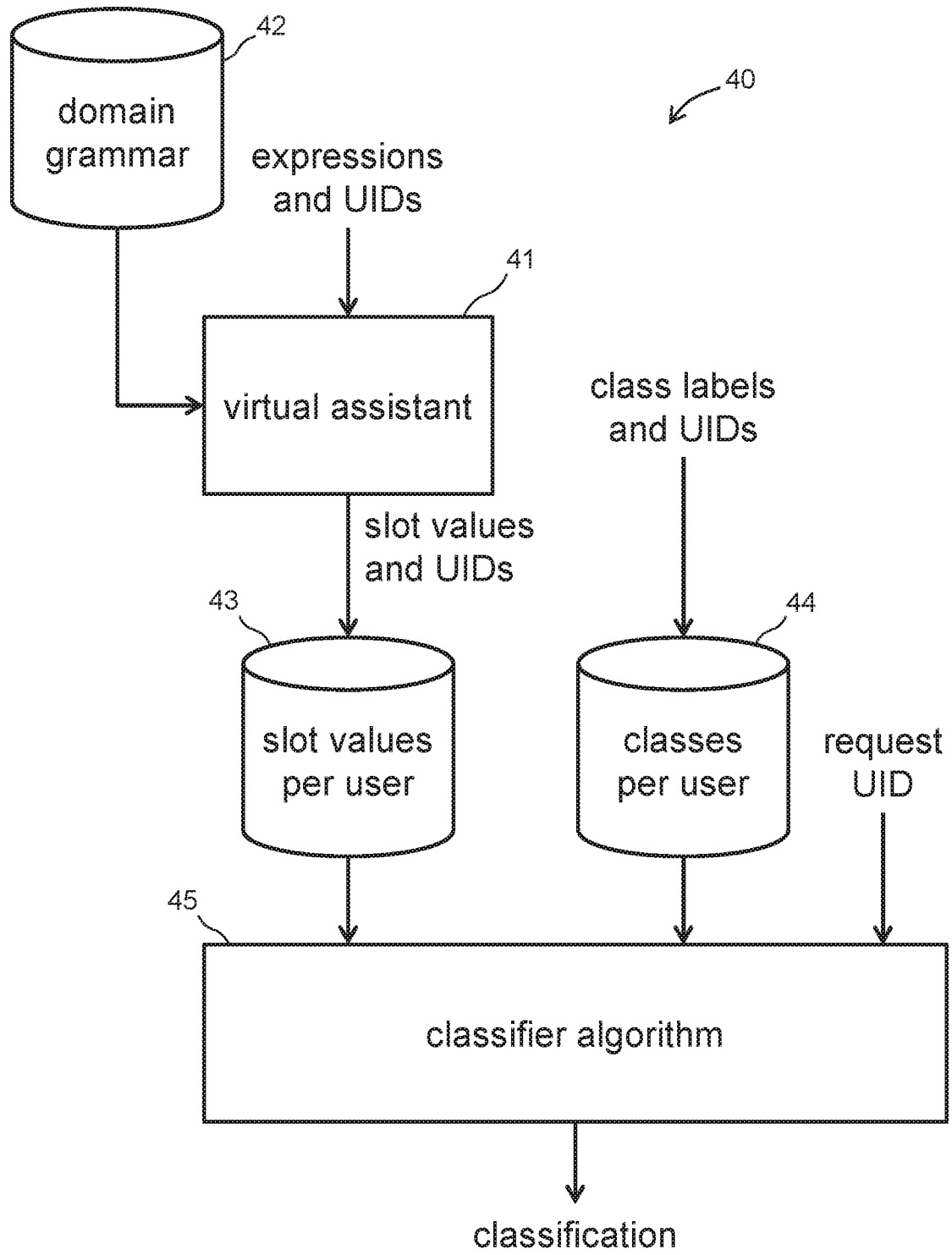
FIG. 4 illustrates a system for classification of users by using grammar slot values according to some embodiments.

FIG. 4 shows an embodiment of a classification system 40. The system 40 comprises a virtual assistant 41, which receives expressions and UIDs, parses the expressions according to a domain grammar 42, and produces pairs of slot values and UIDs. The system 40 stores the slot values, in association with their paired UIDs, in a slot value database 43.

A class database 44 receives and stores pairs of class labels and UIDs. A classifier algorithm 45 takes the slot values per user from database 43 and the classes of known users from database 44 and, for each unlabeled UID that is or that can be requested, computes a classification based on similarities between slot value vectors in database 43.

Some embodiments need labels for only a small portion of all users, such as 100 out of 10,000 or 10,000 out of 100,000,000. In some embodiments, most UIDs have labels, and only a small portion of all users need classification. Generally, for user attributes with random distribution of class variation across users, the more labeled data the database 44 has, the more accurate the classification is.

Some users are self-labeled. For example, users who enter their name, gender, home address, birth date, or marital status provide information that is useful for many classification client requests. In some embodiments, humans label UIDs. For example, some embodiments use human data labelers to listen to user speech audio and enter the gender and accent of users. Such data labelers also, in some embodiments, correct speech recognition errors, which helps improve the accuracy of classification according to grammar slot values. Some UIDs are labeled by machines. For example, some systems receive geolocation data with user expressions from mobile devices and some do acoustic processing on user speech audio to identify gender, accent, age range, and environmental noise. Some embodiments do linguistic labeling of users, such as by analyzing language usage such as slang and colloquialisms. Some embodiments classify users by their grammar slot values. For example, some classify by favorite sports team or location of interest in weather queries.

Classifier Services

Figure 5:
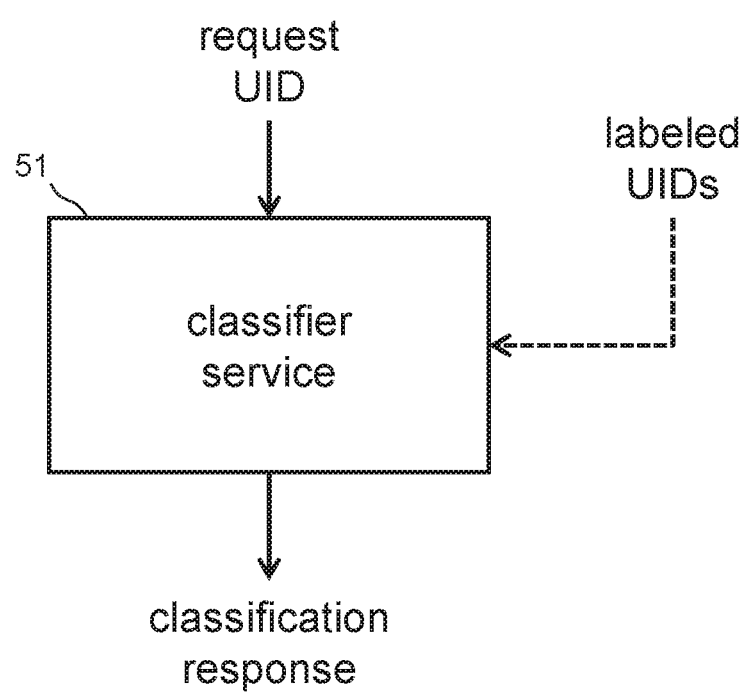
FIG. 5 illustrates a classification service according to some embodiments.

FIG. 5 shows a classifier service data flow according to some embodiments. Classifier service 51 comprises databases of user grammar slot values and labeled user classifications. The classifier service 51 receives classification requests, comprising a request UID, from a classification client. As appropriate, it either performs classification or looks up a pre-computed classification. Classifier services 51 proceeds to provide a classification response to the classification client. This is appropriate for classifications according to commonly used attributes. In some embodiments that are serve advertising uses, gender, age, accent, and location are useful common attributes.

In some embodiments, classifier service 51 accepts labeled UIDs from classification clients. This is useful for classification clients that have unusual or proprietary attributes. Some classification clients label UIDs by conducting user surveys. Some embodiments label UIDs by observing user behavior and making a posteriori conclusions of user attributes.

Various well-known machine learning classification algorithms are appropriate for various embodiments. Some embodiments use singular value decomposition or other methods of collaborative filtering, most of which are essentially matrix factorization approaches. Various open source and widely used proprietary software frameworks are appropriate for various embodiments. Some examples are Tensorflow, Caffe, Spark MLLib, Theano, Torch, Keras, and Scikit-Learn.

Some embodiments, in order to meet achievable run times within practical amounts of processing performance, apply dimensionality reduction. One way to do this is by manually choosing grammar slots of most likely effectiveness for classification according to a desired attribute. Some embodiments add credits assigned to domain providers in credit accumulators, the adding being according to whether classification clients have chosen their grammar slots or how many of their grammar slots classification clients chose for a classifier. This provides an incentive for domain providers to create domains that are of diverse interest and that target especially distinguishing user attributes.

Some embodiments apply dimensionality reduction by computing clustering between grammar slots and attribute classifications and then choosing grammar slots of greatest distinguishing ability. Various known dimensionality reduction algorithms are appropriate for various embodiments.

Some embodiments charge classification clients for credits. Some embodiments make payments to domain providers in proportion to the value of credit accumulators.

Some embodiments compute classification immediately in response to classification requests. The need to provide a prompt classification response limits the amount of data that can be processed within the available time, and therefore limits the achievable accuracy. Some embodiments compute classification infrequently, such as once per day or once per week. Doing so allows the algorithm to spend more time and processing effort in order to achieve results that are more accurate. However, computing classifications only occasionally means that fresh data is not considered. This is especially problematic when a new user enters the system and nothing, or very few, grammar slot values are yet known. This is known as the cold start problem.

Some embodiments, in order to provide high accuracy classification and classification using recently acquired grammar slot values, compute quick classifications using recently acquired grammar slot values to produce probability a distribution for each class, then use those to scale prior-computed classification distributions.

Example Embodiments

FIG. 6A shows an example grammar rule in English used by a virtual assistant server to understand when a user is asking about the weather. It applies to an API that requires a location and a time argument and responds with a weather report. The grammar rule begins with a definition of a grammar with the name "Weather Domain".

Next is a section that assigns default values for two grammar slots. Slot $1 is assigned the value returned by a function current_location( ). That is a data structure that represents the current location of the user making the expression. In some embodiments, the location is a latitude and longitude. The location is provided by a mobile client device when it provides user expression speech audio to a server.

A second grammar slot $t is assigned the value returned by a function current_time( ). That is a data structure that represents, approximately, the time that a user issued an expression.

Next in the grammar rule is a section that describes the ways in which users can make expressions that the natural language virtual assistant should use to detect neither, either, or both of the location and time from an expression. Text segments within parenthesis and separated by pipe symbols are alternative forms of expression. Text segments within brackets are optional parts of expressions. Text segments within angle brackets indicate API arguments and the local variables to pass for those arguments. Therefore, the rule shown will recognize the phrases, "what's the weather", "what is going to be the weather", "what's the weather going to be tomorrow", "what is the weather going to be in Paris", "what's the weather going to be at the Eiffel Tower next week", among other recognizable expressions.

A grammar rule similar to the grammar rule depicted in FIG. 6A can be utilized for Mandarin Chinese. The grammar rule can recognize various Chinese phrases.

FIG. 7 shows a table view of part of the contents of a user slot value database 70 that is useful with the weather domain grammar rule of FIG. 6A and a similar grammar rule utilized for Mandarin Chinese. A first 10 users have made expressions in the weather domain for each of location value "Beijing" or location value "Holland". Each user also either asked about the current weather "now" or the weather "tomorrow". The table also shows, for each of the same 10 users, labels for either their gender ("M" or "F") or favorite beverage ("coffee" or "tea") or both. A new user N asks the virtual assistant about the current weather in Beijing. A classification client requests to classify user N as either somebody who likes coffee or somebody who likes tea. Accordingly, a classifier service will run a classifier algorithm on the slot value data and compute a probability of ¼ that user N likes coffee and ¾ that user N likes tea. As a result, the classifier client will display to user N an electronic drink menu sorted to shows types of tea before types of coffee.

Weather is the most frequently used domain for some virtual assistants. Restaurant reviews, music playing, and SMS messages are also popular. For many modular virtual assistants, large companies create those domains to drive user traffic to their APIs. Some virtual assistant providers enable small companies, academic organizations, and individuals to create domains that provide information that is interesting to some users, but not of great commercial value.

FIG. 8A shows an example of a grammar rule for such a domain that looks up information in a database. It is a domain that accepts requests with the English name of any known species, such as "what is the Latin name for dog", and returns the Latin scientific name for the species, such as "*Canis lupus familiaris*" for dog. A grammar rule similar to the grammar rule depicted in FIG. 8A can be utilized for Mandarin Chinese. It accepts the Chinese name of any known species and returns the Latin scientific name.

FIG. 8C shows an example grammar rule of a simple domain that performs a calculation. It is a domain that accepts a person's weight, a kind of athletic activity, and a duration of time. The domain then returns an amount of energy that is used for such a person doing such an activity for such an amount of time. For example, in response to a user expression, "how much energy is used by a 137 pound person doing running for 15 minutes" the domain provider API responds "141 calories".

A grammar rule similar to the grammar rule depicted in FIG. 8C can be utilized for Chinese. In response to a user expression similar to those entered into the grammar rule depicted in FIG. 8C, but in Mandarina Chinese, the domain provider API can respond with a number of calories using Mandarin Chinese.

FIG. 9 shows a table view of part of the contents of a user slot value database 90 that is useful with the exercise and Latin name domains. 10 users are labeled by their beverage preference as either liking tea or coffee. The users each expressed an activity of either "running", "biking" or "walking" or they did not use the exercise domain. The users each expressed a request for the Latin name of species that is either in the "plant" or "animal" kingdom, or the user did not use the Latin name domain. By associating the labelled UIDs to the slot values, it is possible for a machine learning classification algorithm to calculate that a new user N, who made expressions about "running" exercise has a ¾ probability of preferring tea and a ¼ probability of preferring coffee. If the user N proceeds to make ask for the Latin name of a plant, the machine learning algorithm will reclassify the user N as having a ⅔ probability of preferring tea and a ⅓ probability of preferring coffee.

For embodiments with large numbers of users, large numbers of grammar slots, or large numbers of labelled attributes, data storage and classification processing can stress the practical limits of systems. Some such embodiments use Hadoop Distributed File System (HDFS) or other appropriate framework for distributed storage and data processing.

Slot History

Some embodiments store a history of values for each slot per user. Consider a first user who always asks about the weather in one city, a second user who frequently asks about the weather in two different cities, and a third user who tends to ask about the weather in various cities. In order to classify users by favorite sports team, the classifier algorithm will probably compute a high probability for the first user liking the sports team in the one city, but for the second user the classifier algorithm will probably compute a high probability for a preference of the two cities' teams relative to all other teams. The classifier algorithm will probably compute no team preference significantly stronger than any other team preference for the third user.

For the same three users, an advertising classification client would probably receive a high probability of a click for travel-related advertisements for the third user because of the diversity of cities in weather queries, but a low probability of a click for a travel-related advertisement for the first user because of the lack of queries about multiple cities.

There are various ways to use grammar slot value history that will be apparent to practitioners. Some embodiments compute, before classification, one or more of a statistical variance, mode, and number of distinct slot history values and classify according to one or more of the statistics and, in some embodiments, also according to the most recent or most common slot value.

Some embodiments store, with each historical slot value, a timestamp of when it was expressed. Some such embodiments disregard expression values older than a certain length of time. Some embodiments filter historical values based on the time of day of the expression.

Operation Models

For some embodiments, it is important for legal or ethical reasons not to share specific user data, such as grammar slot values, with third parties, but it is permissible to provide derived information, such as classifications, to third parties. Many vendors, advertisers, and other classification clients, if in possession of user data, would use it for no purpose other than classification, anyway. Therefore, a classification API or other form of delivering classification data is very useful to some classification clients. As a result, classification clients are willing to reward virtual assistant providers for those useful classification data, especially those classifications having high accuracy. This in turn gives the virtual assistant provider a means to reward the third-party domain providers that provide the most useful domain grammars.

According to some embodiments, there are a lot of factors that could influence classification accuracy and value. In some embodiments, having a large number of grammar slots, generally because of having a large number of domains, improves classification accuracy and value. In some embodiments, having a diverse range of domains, particularly including ones that appeal to a broad range of users with slots that distinguish between users, improves classification accuracy and value. In some embodiments, having domains that are addictive, and cause users to make many expressions, improve classification accuracy and value. In some embodiments, having domains that are widely recognized and bring in large numbers of users improves classification accuracy and value. Generally, for various embodiments of virtual assistants, there is a network effect by which having domains that are more interesting brings in more users and having more users makes it more interesting to domain providers to create and improve domains.

To improve the incentive for domain providers to provide more useful domains so as to support virtual assistants, in some embodiments, it is required to provide a more efficient evaluation scheme for the virtual assistant provider to evaluate the one or more domain providers. In some embodiments, the virtual assistant providers assign a credit weight to each of the one or more domain providers, wherein the credit weight is stored in association with a unique identifier of each of the one or more domain providers. This credit weight reflects the contribution of each of the one or more domain providers; in some embodiments, this credit weight scales the amount that a credit accumulator is increased for each domain provider. In some embodiments, this credit weight is in proportion to the amount of classification range that the domain provider's grammar rules provide.

Some embodiments share the rewards from classification requests from classification clients between the virtual assistant provider and one or more domain providers. They do so by subtracting credits of the classification client for each request and increasing credit accumulators for domain providers. Some embodiments simply reward all domain providers. Some embodiments reward domain providers in proportion to the amount of classification range that their grammar rules provide. In some embodiments, the rewards are monetary and the virtual assistant provider charges classification clients to increase their credit count. In some embodiments, the virtual assistant provider pays each of the one or more domain providers an amount of money according to the credit weight assigned. In some embodiments, the credit weight is in proportion to the amount of money the domain provider should be rewarded; and in some embodiments, value of the credit weight itself is equal to the amount of money.

Some embodiments allow classification clients to choose subsets of all domains to use for classification, and only a credit accumulator of the domain providers of the chosen domains would be increased in response to classification requests. Some embodiments allow classification clients to select subsets of domains and provide test sets of labelled data to find a useful subset of domains. The virtual assistant provider charges the classification client based on the number of domains that the classification client chose.

Some such embodiments automatically calculate the domains of greatest distinguishing ability for sets of labelled provided by classification clients, provide a list of domains in order of their ability to distinguish users given the database of grammar slot values. Such embodiments can also provide an accuracy estimation for the subset chosen by the classification client. Some such embodiments, after a classification client selects a domain, re-sort the list according to the incremental benefit of the remaining domains in addition to the selected domain. For example, two competing weather domains might provide the most useful classification, but after a classification client chooses one, the other weather domain would probably contribute to improving classification accuracy very little beyond the value of the chosen weather domain.

Some embodiments provide to domain providers lists of existing slot values and encourage new domain providers to create other slot values. For example, if a weather domain provides a location slot value, new domain providers would be discouraged from creating other location slot values and encouraged to create grammar rules with other useful slot values.

Some embodiments provide lists of desired slots for domain providers to try to make. Some such embodiments provide curated lists (lists chosen by human specialists). Some such embodiments allow classification clients to list desired, likely valuable, grammar slots for domain providers to implement. This creates a market place for domains and grammar slots.

In some embodiments, classification clients may produce functions of grammar slots for the virtual assistant to use. For example, a classification client might want to create a classification slot that is the weather location, but only for users who express the value running in an exercise activity grammar slot.

Weighting Domain Choices

Some embodiments use classification by grammar slots to improve the natural language processing within virtual assistants. Doing so improves the rate of successful interpretations of expressions and thereby improves user satisfaction and success.

Figure 10:
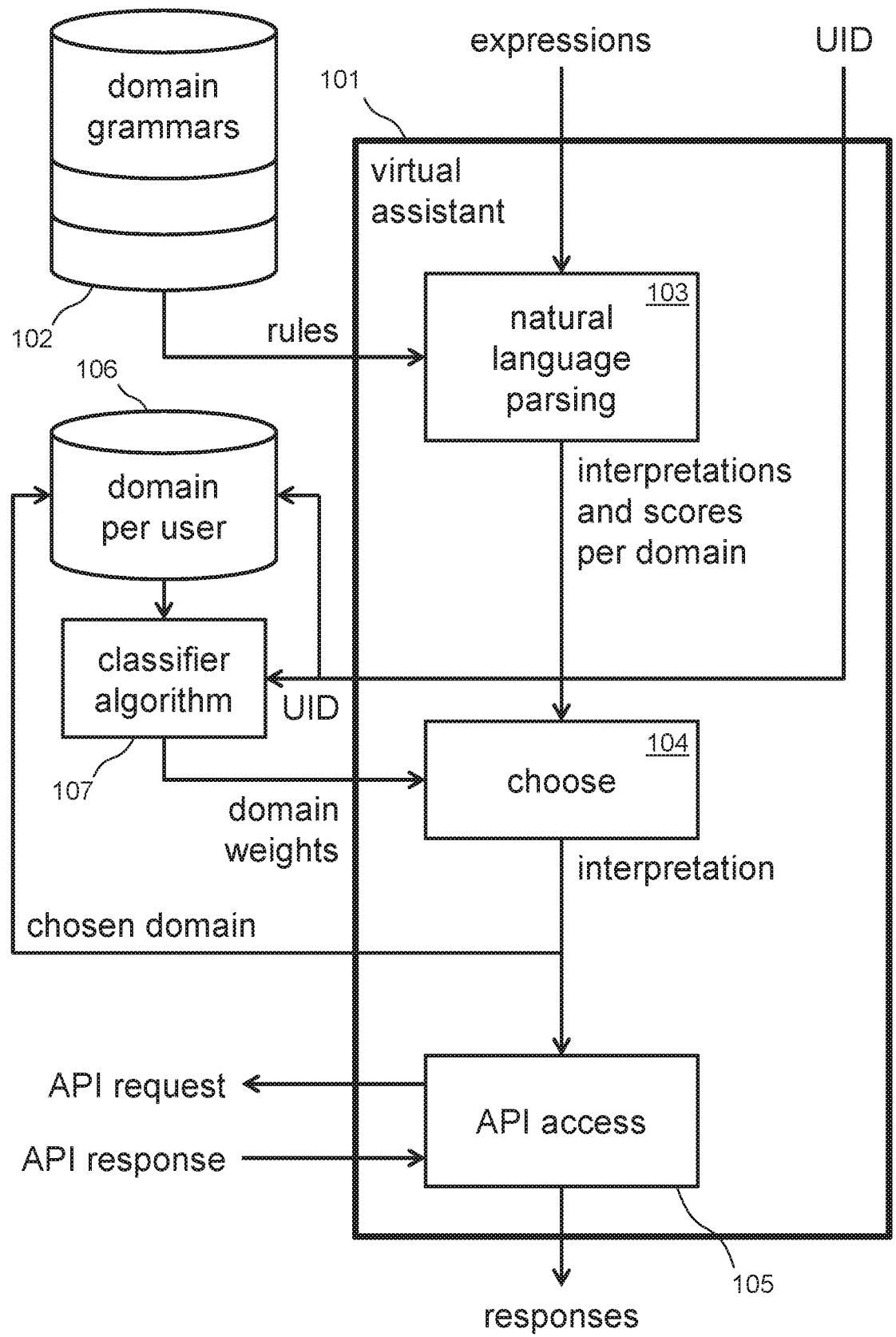
FIG. 10 illustrates a virtual assistant that improves natural language understanding domain choices by user classification by slot values according to some embodiments.

FIG. 10 shows the components of a virtual assistant 101. It receives user expressions and takes in grammar rules from a set of domain grammars 102. A natural language parsing module 103 parses the expression according to the grammar rules to produce a set of possible interpretations and a likelihood score for each one.

A choosing module 104 takes in the interpretations and scores, chooses one interpretation, according to the scores, and outputs the chosen interpretation. An API access module 105 performs a web API hit, which comprises making an API request with values from grammar slots and receiving an API response over a network.

In the embodiment of FIG. 10, the virtual assistant 101 receives a user ID (UID) with each user expression. In response to choosing an interpretation, the virtual assistant outputs the UID and the slot values of the chosen interpretation. The system accumulates, for each expression, the UID and which domain was chosen in a database of domain per user 106. A classifier algorithm 107 processes the data from domain database 106 to produce a domain probability distribution for the UID. The system uses the domain probability distribution as a set of weight values to chooser 104 to scale the interpretation scores in order to affect which interpretation the chooser 104 chooses.

In some embodiment, the classifier domain weights are simply the historical frequency of expressions captured in each domain for the UID. However, this is subject to the cold start problem. In some embodiments, the classifier algorithm calculates a smooth distribution of weights across domains. It does so by comparing the known domain frequencies, even if the system has captured very little data about the user, to domain frequencies of other similar users. Various machine learning classification algorithms are appropriate for various embodiments.

Physical Embodiments

Figure 11:
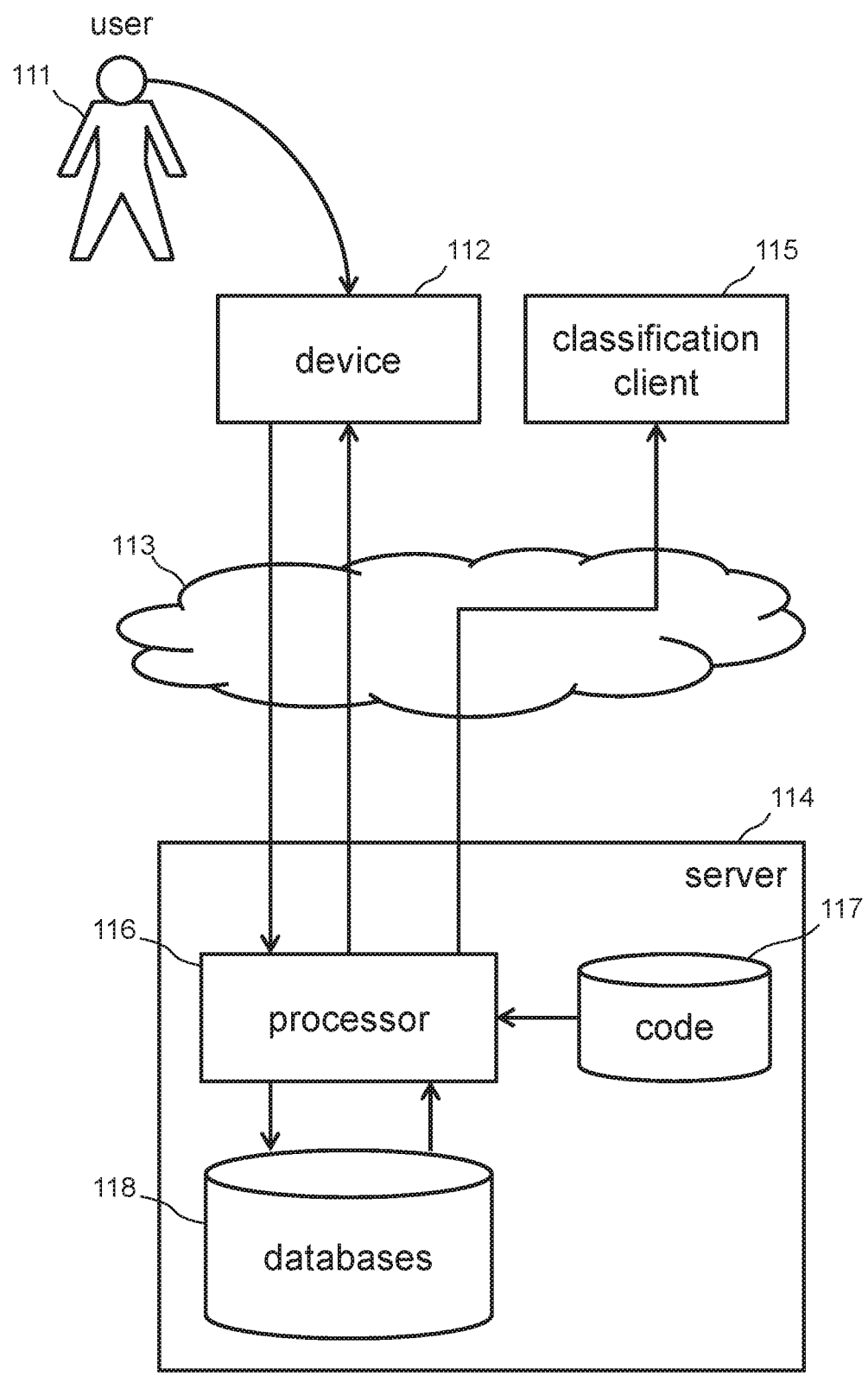
FIG. 11 illustrates a cloud database architecture according to some embodiments.

FIG. 11 shows an embodiment that uses a client-server type of architecture. A user 111 interacts with device 112. Device 112 acts as a client, communicating through network 113 with a server 114. Server 114 behaves as a virtual assistant, providing responses through the network 113 to the device 112. Server 114 also provides classifications to a classification client 115.

Server 114 comprises a processor 116 that processes natural language requests from device 112, produces the responses, and runs the classification algorithms to produce classification results to the classification client 115. Processor 116 executes code stored on a non-transitory computer readable medium 117. Processor 116 processes natural language expressions according to domain grammar rules stored in a database 118. Furthermore, processor 116 stores user slot values and user labels in database 118.

Figure 12A:
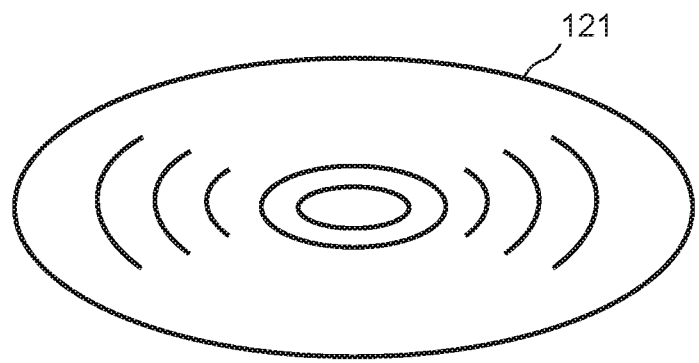
FIG. 12A illustrates a disk non-transitory computer readable medium according to some embodiments.

FIG. 12A shows a rotating disk 121, which is a non-transitory computer readable medium according to some embodiments.

Figure 12B:
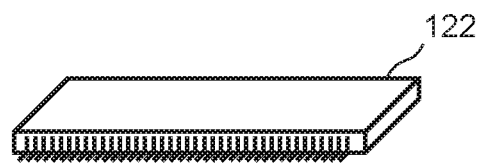
FIG. 12B illustrates a memory chip non-transitory computer readable medium according to some embodiments.

FIG. 12B shows a Flash memory chip 122, which is a non-transitory computer readable medium according to some embodiments.

Figure 12C:
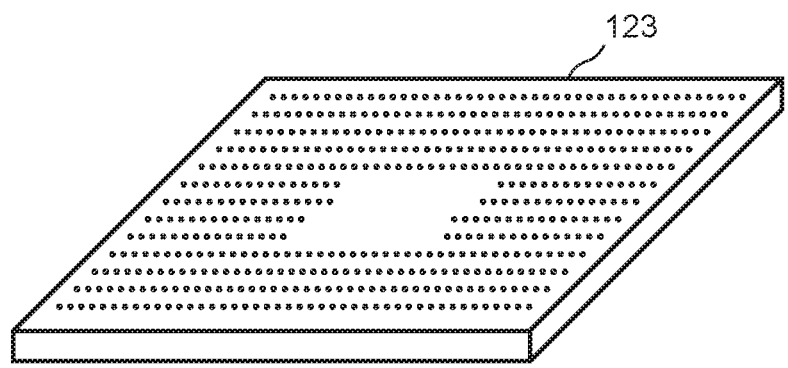
FIG. 12C illustrates a processing chip according to some embodiments.

FIG. 12C shows the bottom side 123 of a packaged system-on-chip device 123 with a ball grid array for soldering to a printed circuit board. The system-on-chip device 123 is a processor according to some embodiments.

Figure 12D:
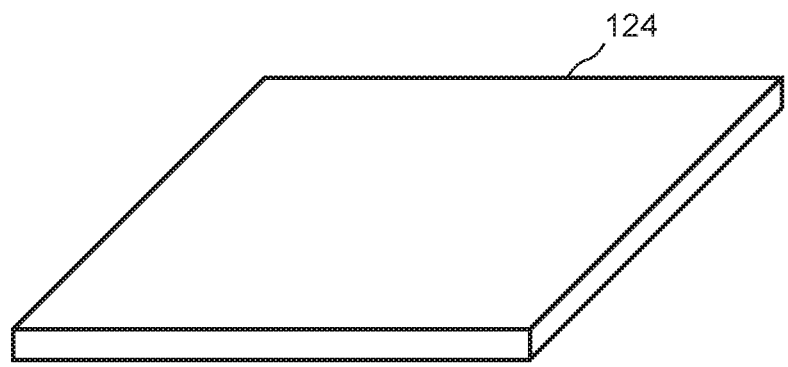
FIG. 12D illustrates a processing chip according to some embodiments.

FIG. 12D shows the top side 124 of the system-on-chip device.

Figure 13A:
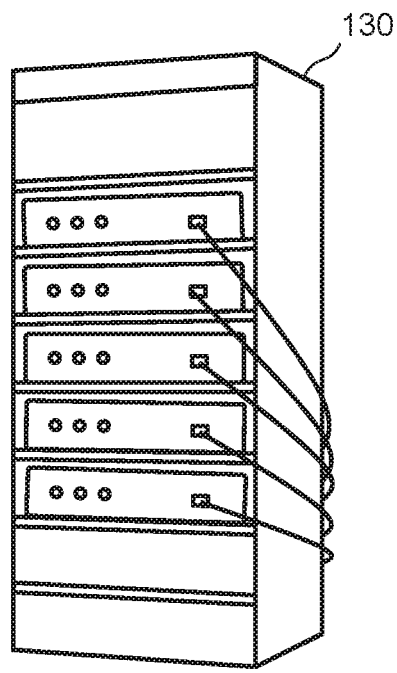
FIG. 13A illustrates a server system according to some embodiments.

FIG. 13A shows a rack-based multi-processor server 130 according to some embodiments.

Figure 13B:
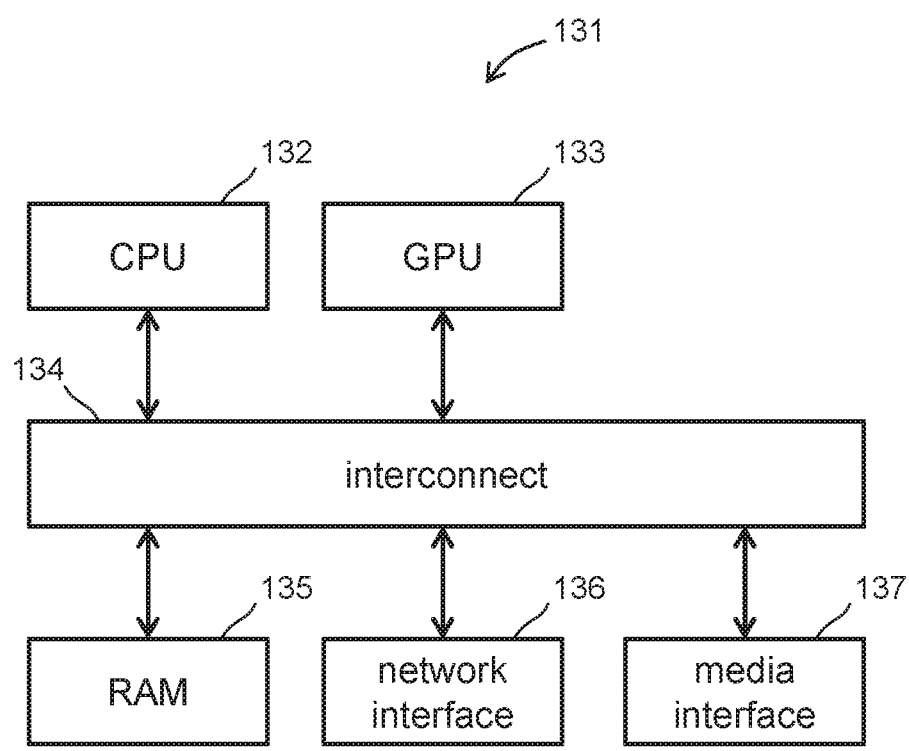
FIG. 13B illustrates a server chip diagram according to some embodiments.

FIG. 13B shows a block diagram of functional components within a processor chip 131 according to some embodiments. Central processing unit (CPU) 132 and graphics processing unit (GPU) 133 perform processing by communicating through an interconnect 134 with a random access memory (RAM) 135 for temporary data storage, a network interface 136 for communication with other servers and devices, and a media interface 137 for receiving user input and providing output to users.

What is claimed is:

1. A computer-implemented method comprising:
    determining grammar slot values by parsing natural language expressions from a multiplicity of users according to a grammar;
    storing the grammar slot values associated with the multiplicity of users in a database of personal information;
    storing parameter values associated with the multiplicity of users in the database;
    at a first time, computing a parameter value of a particular user based on the stored grammar slot values and based on a model trained on the parameter values of other users; and
    in response to a request for classification of the particular user at a second time,
    providing the computed parameter value to a network-connected device;
    incrementing a credit count based on the request
    incrementing a credit accumulator for each classification request; and
    providing a payment to the domain provider in proportion to the value of the credit accumulator;
    determining second grammar slot values by parsing the natural language expressions according to a second grammar, the second grammar being provided by a second domain provider;
    in response to the classification request, adding a second increment to a second credit accumulator; and
    providing a payment to the second domain provider in proportion to the value of the second credit accumulator.

2. The method of claim 1 wherein classification requests are received and parameter values are provided through a web API interface.

3. The method of claim 1 wherein computing the parameter value comprises computing the parameter value based on a probability.

4. The method of claim 1 wherein computing the parameter value comprises computing the parameter value based on a probability for each of multiple attribute labels.

5. The method of claim 1 further comprising:
    charging a classification client to increase the credit count.

6. The method of claim 1 wherein the grammar is provided by a domain provider that is not a virtual assistant provider.

7. The method of claim 1 further comprising:
    storing, for the particular user, a historical value for the slot.

8. The method of claim 7 further comprising:
    storing a timestamp associated with the historical value.

9. A computer system, comprising:
    a processor; and
    system memory coupled to the processor and storing instructions to cause the processor to:

determine grammar slot values by parsing natural language expressions from a multiplicity of users according to a grammar;
store the grammar slot values associated with the multiplicity of users in a database of personal information;
store parameter values associated with the multiplicity of users in the database;
at a first time, compute a parameter value of a particular user based on the grammar slot values and based on a model trained on the parameter values of other users; and
in response to a request for classification of the particular user at a second time,
provide the computed parameter value to a network-connected device;
increment a credit count based on the request;
increment a credit accumulator for each classification request; and
provide a payment to the domain provider in proportion to the value of the credit accumulator;

determine second grammar slot values by parsing the natural language expressions according to a second grammar, the second grammar being provided by a second domain provider;
in response to the classification request, add a second increment to a second credit accumulator; and
provide a payment to the second domain provider in proportion to the value of the second credit accumulator.

10. The computer system of claim 9 further comprising instructions configured to:
receive the grammar from a domain provider that is not a virtual assistant provider prior to determining grammar slot values.

11. The computer system of claim 9 further comprising instructions configured to store, for the particular user, a historical value for the slot.

12. The computer system of claim 11 further comprising instructions configured to store, for the particular user, a timestamp associated with the historical value.

* * * * *